(12) United States Patent
Miyahara et al.

(10) Patent No.: US 8,084,528 B2
(45) Date of Patent: Dec. 27, 2011

(54) HEAT-RESISTANT PAINT

(75) Inventors: Kaoru Miyahara, Yokohama (JP);
Hiroyuki Yoshida, Koshigaya (JP);
Fujio Umebayashi, Tokyo (JP);
Shinsuke Mochizuki, Shiki (JP)

(73) Assignees: Oshima Kogyo Co., ltd., Yokohama-Shi (JP); Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 12/638,790

(22) Filed: Dec. 15, 2009

(65) Prior Publication Data

US 2010/0168308 A1    Jul. 1, 2010

(30) Foreign Application Priority Data

Dec. 26, 2008  (JP) ................. 2008-334234

(51) Int. Cl.
*C08K 3/22*    (2006.01)

(52) U.S. Cl. ........ 524/413; 524/430; 524/431; 524/437; 523/457; 523/458

(58) Field of Classification Search .............. 524/413, 524/430, 431, 437; 523/457, 458
See application file for complete search history.

(56) References Cited

U.S. PATENT DOCUMENTS 6,001,533 A    12/1999    Sega

FOREIGN PATENT DOCUMENTS

| DE | 31 05 963 A1 | 11/1981 |
|----|--------------|---------|
| JP | 61-258871 A  | 11/1986 |
| JP | 63-260966 A  | 10/1988 |
| JP | 7-26059 B2   | 3/1995  |
| JP | 2002-309123 A| 10/2002 |
| JP | 2005-239511 A| 9/2005  |
| JP | 2005-325440 A| 11/2005 |

*Primary Examiner* — Peter Szekely

(74) *Attorney, Agent, or Firm* — Birch, Stewart, Kolasch & Birch, LLP

(57) ABSTRACT

The present invention relates to heat-resistant paint which is capable of forming paint film that inhibits whitening even in high-temperature environments on the order of 350-650° C. The heat-resistant paint of the present invention contains silicone resin and/or epoxy resin as well as black pigment, wherein, said black pigment contains manganese and copper, the content of manganese in said black pigment is 25-45 mass % by MnO conversion, the content of copper in said black pigment is 5-25 mass % by CuO conversion, and the content of silicon in said black pigment is 3 mass % or less by $SiO_2$ conversion.

6 Claims, 1 Drawing Sheet

HEAT-RESISTANT PAINT

TECHNICAL FIELD

The present invention relates to heat-resistant paint.

BACKGROUND ART

As heat-resistant paint, paints which contain black pigment composed of composite oxides are known. As the pertinent composite oxides, Fe—Cu—Mn—Cr system (e.g., Patent Document 1), Cu—Mn—Fe system (e.g., Patent Document 2), and so on are known.

Heat-resistant paint is used in applications where heat resistance is required, such as, for example, paint that serves to enhance the external appearance of mufflers of two-wheeled motor vehicles (Patent Document 1).

Patent Document 1: Japanese Examined Patent Application No. H07-026059

Patent Document 2: Japanese Unexamined Patent Application, First Publication No. 2002-309123

DISCLOSURE OF THE INVENTION

Figure 1:
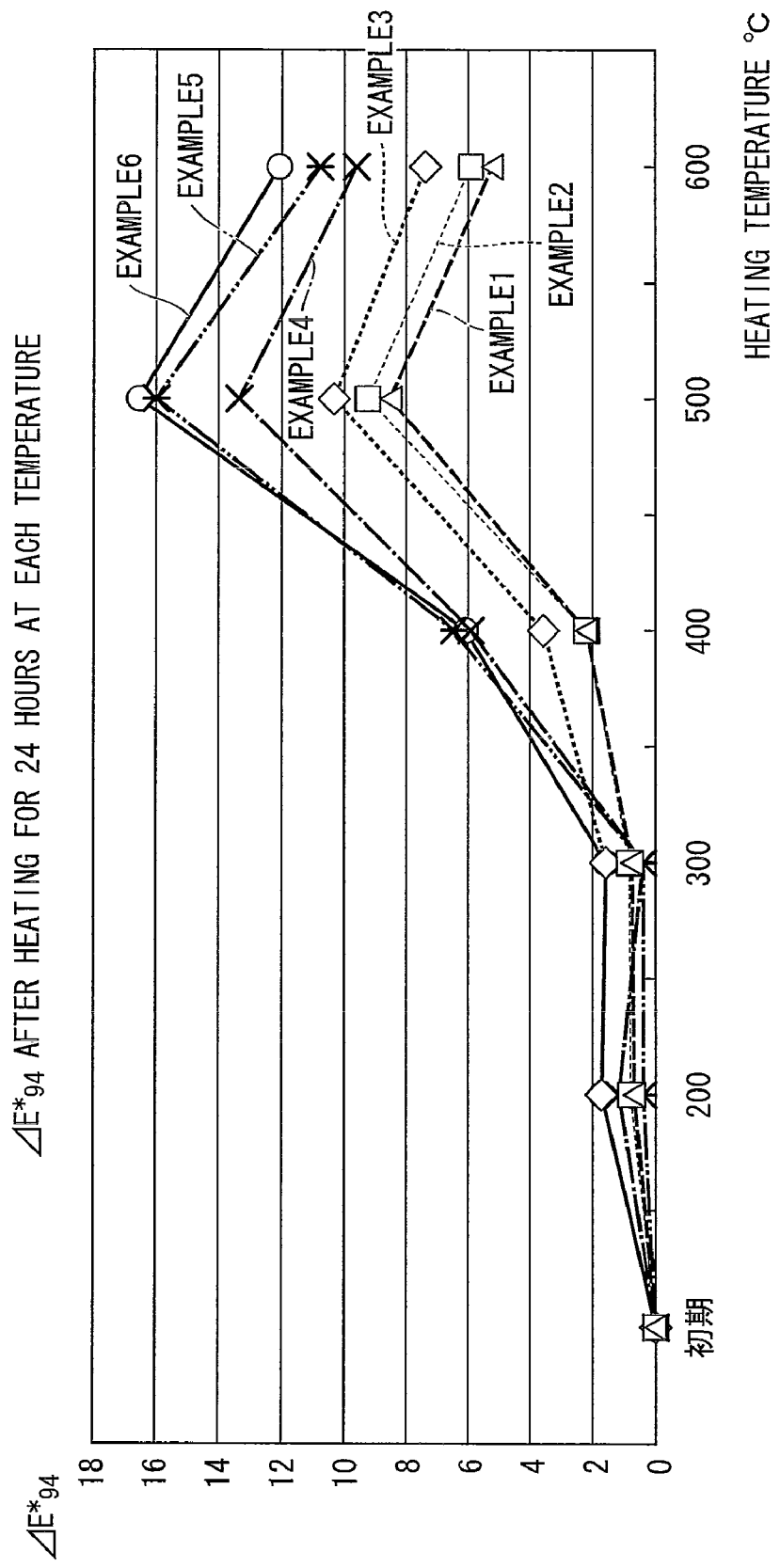
FIG. 1 is a graph which shows the relation of temperature in heat resistance testing and color difference $\Delta E^*_{94}$ before and after heat resistance testing of paint films formed from the heat-resistant paints of examples 1 to 6.

Problem that the Invention is to Solve

Incidentally, in the case where the muffler of a two-wheeled motor vehicle has an internal catalyst, the surface temperature of the muffler reaches high temperatures of 350° C. or more. However, when ordinarily obtainable black pigments are used, paints which are exposed to high temperatures of 350° C. or more over a long period may be gradually whitened. Whitening is particularly pronounced in paint near the catalyst, which may cause color irregularity between paint that is near the catalyst and paint that is farther from it.

The present invention provides heat-resistant paint which is capable of forming a paint film that inhibits whitening even in high-temperature environments on the order of 350-650° C.

Means for Solving the Problem

The heat-resistant paint of the present invention is heat-resistant paint which contains silicone resin and/or epoxy resin as well as black pigment, wherein said black pigment contains manganese and copper, the content of manganese in said black pigment is 25-45 mass % by MnO conversion, the content of copper in said black pigment is 5-25 mass % by CuO conversion, and the content of silicon in said black pigment is 3 mass % or less by $SiO_2$ conversion.

The aforementioned black pigment further contains aluminum, and it is preferable that the aluminum content in the aforementioned black pigment be 5-10 mass % by $Al_2O_3$ conversion.

The aforementioned black pigment further contains iron, and it is preferable that the iron content in the aforementioned black pigment be 15-65 mass % by $Fe_2O_3$ conversion, and 15-35 mass % is more preferable.

The aforementioned black pigment further contains sodium, and it is preferable that the sodium content in the aforementioned black pigment be more than 0 mass % and 2 mass % or less by $Na_2O$ conversion.

Effects of the Invention

The heat-resistant paint of the present invention is capable of forming a paint film which inhibits whitening even in high-temperature environments on the order of 350-650° C.

BEST MODE FOR CARRYING OUT THE INVENTION

<Heat-Resistant Paint>

The heat-resistant paint of the present invention contains silicone resin and/or epoxy resin as well as black pigment, and contains solvents, additives and the like as necessary.

The solid content concentration of the heat-resistant paint may be appropriately selected according to the type of resin, the application method, the thickness of the paint film, and so on.

The content of black pigment in the solid content of the heat-resistant paint is ordinarily 20-40 mass %.

(Resin)

Silicone resin includes straight silicone resins (dimethyl silicone resin, methylphenyl silicone resin, and the like) and modified silicone resins (epoxy-modified silicone resin, polyester-modified silicone resin, and the like), and straight silicone resins are preferable. One type of the silicone resin may be used alone, or two or more types may be used in combination.

Epoxy resin includes bisphenol A epoxy resin and bisphenol F epoxy resin, and the like. One type of the epoxy resin may be used alone, or two or more types may be used in combination.

It is also acceptable to make combined use of the silicone resin and the epoxy resin.

(Black Pigment)

The black pigment is composed of composite oxides containing manganese and copper.

The manganese content in the black pigment is 25-45 mass % by MnO conversion, and the copper content in the black pigment is 5-25 mass % by CuO conversion. When the manganese and copper contents are within the pertinent ranges, then there are many elements which can stably exist as MnO (black) and CuO (black) even under oxidizing conditions, and thus whitening of the paint film in high-temperature environments is inhibited.

Even if the manganese and copper contents are within the pertinent ranges, when a large amount of silicon is contained in the black pigment, whitening of the paint film in high-temperature environments tends to be promoted. Consequently, it is important that the black pigment contain as little silicon as possible. Specifically, silicon content in the black pigment is to be 3 mass % or less by $SiO_2$ conversion.

It is preferable that the black pigment further contain aluminum.

It is preferable that aluminum content in the black pigment be 5-10 mass % by $Al_2O_3$ conversion. When aluminum content is 5 mass % or more by $Al_2O_3$ conversion, oxidation of other elements contained in the black pigment is inhibited, and paint discoloration is inhibited. As $Al_2O_3$ itself is white, it is preferable that aluminum content be 10 mass % or less by $Al_2O_3$ conversion in order to produce a darker black.

It is preferable that the black pigment further contain iron.

It is preferable that iron content in the black pigment be 15-65 mass % by $Fe_2O_3$ conversion. When iron content is within the pertinent range, whitening of the paint film in high-temperature environments is further inhibited. As $Fe_2O_3$ (reddish brown) is produced when FeO (black) is oxidized, it is more preferable that iron content be 15-35 mass % by $Fe_2O_3$ conversion from the standpoint of inhibiting discoloration of the paint film due to oxidation. It is preferable that the black pigment further contain Mn, Cu, Si, and Fe.

It is preferable that the black pigment further contain sodium.

It is preferable that sodium content in the black pigment be in excess of 0 mass % and 2 mass % or less by $Na_2O$ conversion. When sodium content is within the pertinent range, whitening of the paint film in high-temperature environments is further inhibited. It is preferable that the black pigment further contain Mn, Cu, Si, and Na. It is preferable that the black pigment further contain Mn, Cu, Si, Fe and Na. It is preferable that the black pigment further contain Mn, Cu, Si, Al, and Na.

The black pigment may contain other elements (such as barium, sulfur, calcium, titanium, phosphorus, potassium, chrome, magnesium, and chlorine) as necessary within a range that does not impair the effects of the present invention.

The black pigment can be manufactured by a conventional manufacturing method.

The content of each element contained in the black pigment can be adjusted by adjusting the blending ratio of the raw materials (such as metallic salts) used to manufacture of the black pigment.

The content of each element contained in the black pigment is determined by fluorescent X-ray analysis.

(Solvents)

Solvents include aromatic compounds (such as toluene and xylene) and alcohols (such as butanol), and the like.

(Additives)

Additives include known additives such as fillers (for example, reinforcing agents and extender pigments), rustproofing pigments, thickening agents, hardeners, and dispersants.

Reinforcing agents include aluminum phosphate, calcium molybdenate, and so on.

Extender pigments include mica powder, potassium titanate fiber, silicate pigment, calcium carbonate, barium sulfate, and so on.

Rustproofing pigments include metallic zinc powder and so on.

(Paint Application Method)

A paint application method using the heat-resistant paint of the present invention includes the method of applying the heat-resistant paint onto a base material, and performing heat treatment.

As the application method, known application methods (such as spraying and brushing) may be used.

Heat treatment conditions may be appropriately determined according to resin and solvent types, the solid content concentration of the paint, the thickness of the coating, and so on.

It is also acceptable to form in advance a base coat layer containing rustproofing pigments on the surface of the base material, and to conduct blast treatment in order to enhance adherence with the paint film.

Examples

Examples are shown below.

Examples 1 and 2 are the working examples, and examples 3 to 6 are the reference examples.

The measurement methods and evaluation methods of the examples are as follows.

(Fluorescent X-Ray Analysis)

Using a fluorescent X-ray analyzer (ZSX100e, manufactured by Rigaku Co.), fluorescent X-ray analysis was conducted by the briquette method. Specifically, black pigment was molded into a discoid sample using a press machine, the pertinent discoid sample was set in a holder of the fluorescent X-ray analyzer, and its fluorescent X-ray intensity was measured. A quantitative value was obtained by the FP quantification method and corrected using an Ig loss value of the black pigment that was measured in advance, and the content of each element was determined.

(Color Difference $\Delta E^*_{94}$)

Heat-resistant test samples were fabricated by applying the heat-resistant paint to a substrate (SUS 409L), and heating it for 20 minutes at 180° C. to form a paint film with a thickness of 20-30 μm. With respect to the paint film of the pertinent samples, color measurement of $L^*$, $a^*$, $b^*$ was conducted in a $L^*a^*b^*$ colorimetric system using a colorimeter (CM-700d, manufactured by Konica-Minolta Sensing Co.) in accordance with JIS Z8730.

The samples were subjected to heat resistance testing by being heated for 24 hours at prescribed temperatures (200° C., 300° C., 400° C., 500° C., 600°). Color measurement of $L^*$, $a^*$, $b^*$ was similarly conducted on the paint film of the samples after heat resistance testing.

The color differences $\Delta E^*_{94}$ were determined from $L^*$, $a^*$, $b^*$ before and after heat resistance testing in accordance with JIS Z8730.

Examples 1-6

Black pigments having the compositions (the results of fluorescent X-ray analysis) shown in Table 1 were prepared. 30 mass parts of the respective black pigment, 50 mass parts of straight silicone resin (TSR1452, manufactured by Momentive Performance Materials Japan, a consolidated company; solid content: 60 mass %), and 20 mass parts of solvent (xylene) were mixed together to obtain the heat-resistant paints of examples 1 to 6. Samples for heat resistance testing were fabricated using the respective heat-resistant paints, and the color differences $\Delta E^*_{94}$ before and after heat resistance testing of the paint film were obtained. The results are shown in FIG. 1.

TABLE 1

| | Fluorescent X-ray analysis results (mass %) for black pigment | | | | | | | | | | | | | | | |
|---|---|---|---|---|---|---|---|---|---|---|---|---|---|---|---|---|
| Examples | MnO | CuO | $Fe_2O_3$ | $Al_2O_3$ | $Na_2O$ | $SiO_2$ | BaO | $SO_3$ | CaO | $TiO_2$ | $P_2O_5$ | $K_2O$ | $Cr_2O_3$ | MgO | ClO | Ig loss |
| 1 | 42.90 | 24.40 | 16.60 | 8.64 | 1.05 | 2.89 | 0.45 | 0.20 | 0.09 | 0.09 | 0.10 | 0.49 | 0.02 | 0.08 | 0.25 | 1.72 |
| 2 | 26.10 | 6.08 | 61.20 | 0.97 | 0.27 | 2.22 | 0.13 | 0.10 | 0.27 | 0.16 | 0.10 | 0.24 | 0.12 | 0.11 | 0.06 | 1.81 |
| 3 | 18.90 | 5.59 | 38.40 | 1.03 | 0.44 | 3.38 | 18.30 | 9.52 | 0.28 | 0.14 | 0.13 | 0.13 | 0.12 | 0.08 | 0.05 | 3.48 |
| 4 | 35.90 | 25.10 | 22.20 | 1.41 | 0.07 | 7.86 | 2.47 | 0.12 | 0.85 | 0.07 | 0.08 | 0.09 | 0.31 | 0.09 | 0.42 | 2.90 |
| 5 | 21.30 | 0.00 | 71.30 | 1.37 | 0.48 | 2.82 | 0.13 | 0.31 | 0.09 | 0.21 | 0.12 | 0.08 | 0.22 | 0.38 | 0.05 | 0.70 |
| 6 | 28.60 | 0.00 | 63.90 | 1.37 | 0.16 | 1.81 | 0.28 | 0.50 | 0.05 | 0.06 | 0.09 | 0.39 | 0.04 | 0.06 | 0.02 | 2.56 |

With respect to the paint film followed from the heat-resistant paints of examples 3 to 6, whitening was recognized after heat resistance testing of 400-600° C., and major discoloration was also confirmed from the results of color difference $\Delta E^*_{94}$.

With respect to the paint film formed from the heat-resistant paints of examples 1 and 2, whitening was fully inhibited in comparison to examples 3 to 6, and the results of color difference $\Delta E^*_{94}$ also confirmed that there was little discoloration in comparison to examples 3 to 6.

INDUSTRIAL APPLICABILITY

The heat-resistant paint of the present invention is useful as paint in applications where heat resistance and attractive external appearance are required, such as with the paint film of mufflers of two-wheeled motor vehicles.

The invention claimed is:

1. A heat-resistant paint containing silicone resin and/or epoxy resin as well as black pigment, wherein:
   said black pigment contains manganese and copper;
   the content of manganese in said black pigment is 25-45 mass % by MnO conversion;
   the content of copper in said black pigment is 5-25 mass % by CuO conversion;
   and the content of silicon in said black pigment is 3 mass % or less by $SiO_2$ conversion, wherein said black pigment further contains aluminum,
   and the aluminum content in said black pigment is 5-10 mass % by $Al_2O_3$ conversion.

2. The heat-resistant paint according to claim 1, wherein said black pigment further contains iron,
   and the iron content in said black pigment is 15-65 mass % by $Fe_2O_3$ conversion, conversion.

3. The heat-resistant paint according to claim 2, wherein the iron content in said black pigment is 15-35 mass % by $Fe_2O_3$ conversion.

4. The heat-resistant paint according to claim 1, wherein said black pigment further contains sodium,
   and the sodium content in said black pigment is more than 0 mass % and 2 mass % or less by $Na_2O$ conversion.

5. The heat-resistant paint according to claim 2, wherein said black pigment further contains sodium,
   and the sodium content in said black pigment is more than 0 mass % and 2 mass % or less by $Na_2O$ conversion.

6. The heat-resistant paint according to claim 3, wherein said black pigment further contains sodium,
   and the sodium content in said black pigment is more than 0 mass % and 2 mass % or less by Na2O conversion.

* * * * *